United States Patent [19]

Carr, Jr. et al.

[11] Patent Number: 4,547,295
[45] Date of Patent: Oct. 15, 1985

[54] FILTRATION OF WET PROCESS SUPERPHOSPHORIC ACID

[75] Inventors: Jesse M. Carr, Jr.; Raymond E. Sheler, both of Washington; Frank J. Richards, Aurora; Eric Kelder, Washington, all of N.C.

[73] Assignee: Texasgulf Inc., Stamford, Conn.

[21] Appl. No.: 559,202

[22] Filed: Dec. 7, 1983

[51] Int. Cl.$^4$ ............................................. C01B 25/16
[52] U.S. Cl. .................................. 210/777; 423/321 R
[58] Field of Search .................... 423/321 R; 210/777, 210/778

[56] References Cited

U.S. PATENT DOCUMENTS

| | | | |
|---|---|---|---|
| 3,554,728 | 1/1971 | Moore et al. | 71/33 |
| 3,632,329 | 1/1972 | Tillman et al. | 71/34 |
| 4,083,934 | 4/1978 | Jernigan et al. | 423/321 R |
| 4,235,854 | 11/1980 | Smith et al. | 423/321 R |
| 4,238,334 | 12/1980 | Halbfoster | 210/777 |
| 4,313,919 | 2/1982 | Richards et al. | 423/321 R |
| 4,332,779 | 6/1982 | Thibodeau et al. | 210/778 |
| 4,443,421 | 4/1984 | Hollifield et al. | 423/321 R |

FOREIGN PATENT DOCUMENTS

| | | | |
|---|---|---|---|
| 26371 | 11/1968 | Japan | 210/777 |
| 1146556 | 3/1969 | United Kingdom | 423/321 R |
| 1155721 | 6/1969 | United Kingdom | 423/321 R |

Primary Examiner—John Doll
Assistant Examiner—Wayne A. Langel
Attorney, Agent, or Firm—Bell, Seltzer, Park & Gibson

[57] ABSTRACT

Filtration of wet process superphosphoric acid by vacuum filtration is greatly enhanced by the use of a filter aid having a statistically selected distribution of particle sizes.

15 Claims, 5 Drawing Figures

FILTRATION OF WET PROCESS SUPERPHOSPHORIC ACID

BACKGROUND OF THE INVENTION

The present invention relates to improving the efficiency and productivity of the filtration of solids from liquid-solid mixtures. More particularly, the invention relates to the filtration of insoluble solids from superphosphoric acid. As used herein the term "superphosphoric acid" refers to an acid having a concentration of $P_2O_5$ of between about 68 and 72% by weight.

In the commercial production of phosphoric acid, an acid with a concentration of $P_2O_5$ of about 70% by weight is referred to as "superphosphoric acid." Superphosphoric acid is a precurser of other commercial chemical compounds, such as fertilizers. Consequently, in most cases it is necessary that the superphosphoric acid meet certain commercial standards. Because of the method of production of superphosphoric acid, and becuase of its peculiar highly concentrated nature, certain solid impurities or precipitates are characteristically present in the superphosphoric acid when it is produced. These must be removed before the superphosphoric acid is suitable for certain commercial applications. Additionally, the solid impurities or precipitates can cause difficulty in handling the acid after it has been produced.

Superphosphoric acid is generally produced by the two-step evaporation of less concentrated phosphoric acid. The raw material in the production process is phosphate ore, present in which are many of the impurities which later must be filtered out as precipitates in the superphosphoric acid. Sulfuric acid is added to the phosphate ore and produces phosphoric acid with a concentration of about 30% $P_2O_5$ by weight. This acid is filtered to remove gross impurities and then evaporated to a concentration of about 54% $P_2O_5$ by weight. The 54% acid is then purified either by filtration or by letting insolubles settle out. Finally, the 70% by weight superphosphoric acid is produced by further evaporation of the 54% acid. The nature of the 70% superphosphoric acid is such that materials which are soluble in 54% acid, and thus cannot be filtered out at that concentration, become insoluble in superphosphoric acid and must be filtered out at the higher concentration. Thus, filtration of superphosphoric acid is a necessary step in the production process regardless of the purity of the 54% acid from which it is made.

As is known in the art, filtration of superphosphoric acid presents several problems. The acid is very viscous, highly reactive and impurities are present as relatively small-sized crystals. Furthermore, impurities present in the acid can cause problems in commercial chemical compounds which use the acid as a precursor; for example, liquid fertilizers. As examples of the problems surrounding superphosphoric acid filtration, U.S. Pat. Nos. 4,409,194; 3,632,329; and 3,554,728 all teach methods of removing impurities from either superphosphoric acid itself, or from commercial fertilizers prepared from superphosphoric acid. All of these references, however, teach methods of favorably precipitating solids from either the acid or its by-products; none teaches an improved method of filtering the acid in its initial manufactured state.

One method of filtration of superphosphoric acid is by vacuum filtration such as with a rotary vacuum drum precoat filter. In this system, a precoat of filter aid is applied to the screen surface of a rotating drum, to the interior of which a vacuum is applied. The vacuum draws the superphosphoric acid and its solid impurities onto the surface of the precoat. The nature of the filter aid is such that the superphosphoric acid passes through while the solid impurities remain on the precoat.

In filtration by the rotary vacuum drum precoat filter a problem arises as the acid is filtered; namely, the surface of the precoat becomes coated with the filtered impurities. Without a clean surface of precoat, the efficiency of the filtration system drops rapidly. The solution to this problem is the "doctor" or "doctoring" knife. The doctor knife is set near the rotating drum and serves to scrape off a certain amount of the outermost layer of precoat as the drum rotates past the knife. By removing an outer layer of precoat, the knife also removes the layer of solid impurities built upon the outer surface of the precoat. The result is that a fresh surface of precoat is presented to the acid to be filtered each time the drum rotates past the knife.

As a usual practice, a filtering cycle is begun by building up a desired thickness of filter aid upon the screen surface of the rotating drum of a desired thickness of filter aid. As the acid is filtered, the doctor knife is slowly advanced towards the drum so that it may continuously remove filter aid contaminated with impurities from the drum. It will be seen that the knife will eventually advance enough to remove sufficient filter aid from the drum so that filtration can no longer take place. At this point the filtering system is "recycled" by washing the remaining filter aid upon the drum. It will thus be seen that the rate at which the doctor knife advances through the precoat on the drum is the primary variable in determining the time necessary for one filtration cycle to take place.

As is known in the art, a desirable filter aid should be made up of non-compressible particles, should be of low bulk density, should be porous, and should be chemically inert to the filtrate. When properly chosen, a filter aid is particularly useful in filtering finely divided solids and slimy "floc" type precipitates.

One well known filter aid material is diatomaceous earth. Diatomaceous earth is a porous, mainly silica, material made up of the shells of diatoms, which in turn are a group of algae characterized by their symmetrical shell walls.

SUMMARY OF THE INVENTION

The present invention provides a novel filter aid commercially suitable for removing solid impurities from superphosphoric acid in vacuum precoat filtration processes. A critical feature of the invention is the statistical selection of a heterogenous mixture of filter aid particle sizes that enhance the flow rate of the filtration system while serving to filter or entrap the impurities at or very near the surface of the precoat.

Broadly, the filter aid of the present invention is a statistically selected mixture of particle sizes of a suitable composition, e.g. diatomaceous earth, wherein different particle size ranges within the mixture are carefully controlled to perform specific functions, while the distribution of the entire mixture is particularly suited to provide the proper interstitial spacing to enhance the overall flow rate through the precoat. More particularly, the mixture includes relatively large particles on the order of the size of the screen openings and larger that serve the purpose of bridging the screen openings. A second group of smaller particles, in a size range on the order of the size range of the impurities to be filtered out, serve to fill the smaller interstitial openings in the mixture so as to filter or entrap the impurities at the surface of the precoat. A third intermediate range of particle sizes, in conjunction with the larger and smaller particles, define the proper packing and interstitial spacing to allow the filtrate to flow rapidly through the filter aid. Most perferably, the particle sizes approximate a normal distribution over the range of particle sizes.

In one aspect the invention may be defined as a filter aid formed from by a heterogenous mixture of particles wherein from about 18% to about 30% by weight of the particles have a size greater than about 225 microns; from about 12% to about 25% by weight of the particles have a size less than about 42 microns; and the remainder of the particles are distributed throughout an intermediate range of particle sizes between about 42 microns to about 225 microns. The distribution of the particles preferably is weighted toward the mean size of the heterogeneous mixture and, most preferably, the distribution approximates a normal distribution wherein the mean size is between about 80 and about 130 microns, with a mean size on the order of about 105 microns being most preferred.

By use of the instant invention, it has now become commercially feasible to filter superphosphoric acid at enhanced flow rates while at the same time increasing the efficiency of the system as measured in Tons $P_2O_5$/Ton filter aid. Futhermore, in commercial applications the percentage of down time of the system for recycling has been reduced dramatically due to longer precoat life.

BRIEF DESCRIPTION OF THE DRAWINGS

The invention will be more fully understood from the following detailed description thereof taken in connection with the accompanying drawings, in which.

DETAILED DESCRIPTION OF THE INVENTION

While the present invention will be described more fully hereinafter, it is to be understood at the outset that the description which follows is a broad, teaching disclosure directed to persons of skill in the appropriate arts, and not as limiting upon the present invention.

Figure 1:
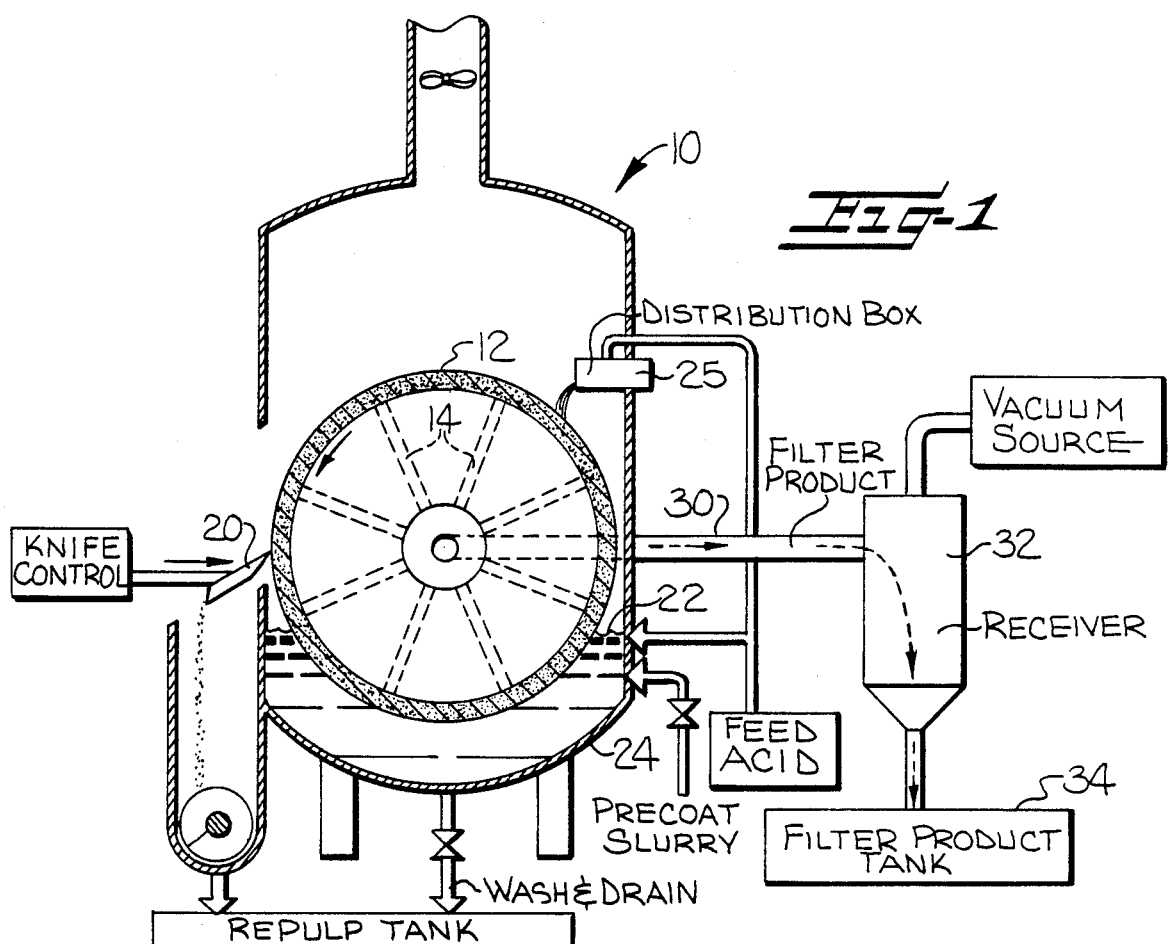
FIG. 1 is a schematic representation of a rotary vacuum drum precoat filter of a type most preferred for use in association with the present invention.
Figure 3:
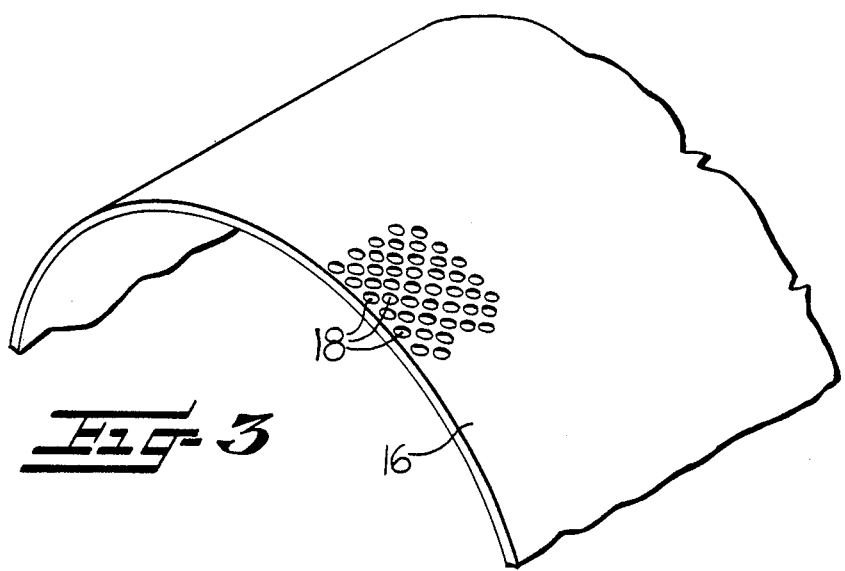
FIG. 3 is a perspective view of the filtration screen of the rotary vacuum drum, in which the size of the permanent openings in the filtration screen are shown greatly exaggerated for illustrative purposes.
Figure 4:
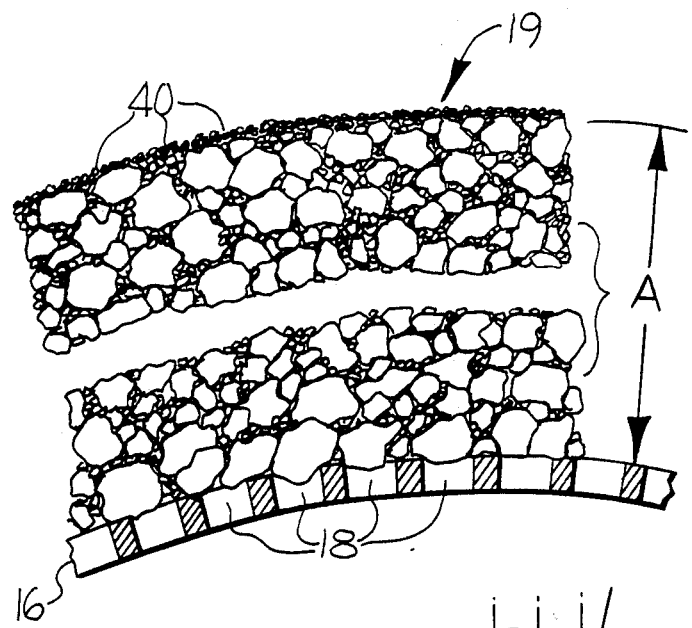
FIG. 4 is a cross sectional view through a portion of the drum and applied filter aid precoat on a greatly enlarged scale and showing an exaggerated curvature of the drum in relation to the size of the permanent openings in the filtration screen.

Referring to the drawings, and particularly to FIG. 1, there is illustrated the most preferred vacuum or pressurized filter for use in association with the present invention. This filter takes the form of a rotary vacuum drum precoat filter 10. Filter 10 includes a rotating drum 12 and vacuum lines 14 for applying a vacuum to the interior of the drum. The drum 12 includes a typical screen surface 16, defining uniform openings 18, all as best shown in FIGS. 3 and 4. Vacuum is applied to the screen surface of the drum and serves to support on the drum a generally uniform precoat 19 of filter aid in a manner well known in the art. The thickness of the precoat is designated by the reference character A in FIG. 4. The initial thickness A may be on the order of 2 ½ inches.

Superphosphoric acid is applied to the precoat by rotating drum 12 through an acid container 24, with a supplemental application being made by means of a distribution box 25. The applied acid thereafter passes through the particles of filter aid with the solid impurities 40 (FIG. 4) being filtered out or entrapped at or very near the surface of the precoat. A doctor knife 20 rests against the outer surface of the precoat 19 and serves to continuously remove a thin outer layer of the precoat and entrapped solid impurities. Since drum 12 as shown in FIG. 1 rotates in a counterclockwise manner, the knife 20 continuously removes the material just before the precoat is re-exposed to the superphosphoric acid 22 in acid container 24. In this matter, a fresh surface of precoat 19 is continually presented to the superphosphoric acid 22. The filtered acid, meanwhile, is drawn through the vacuum lines 14, the filter product line 30, the receiver 32 and collected in the filter product tank 34.

Figure 5:
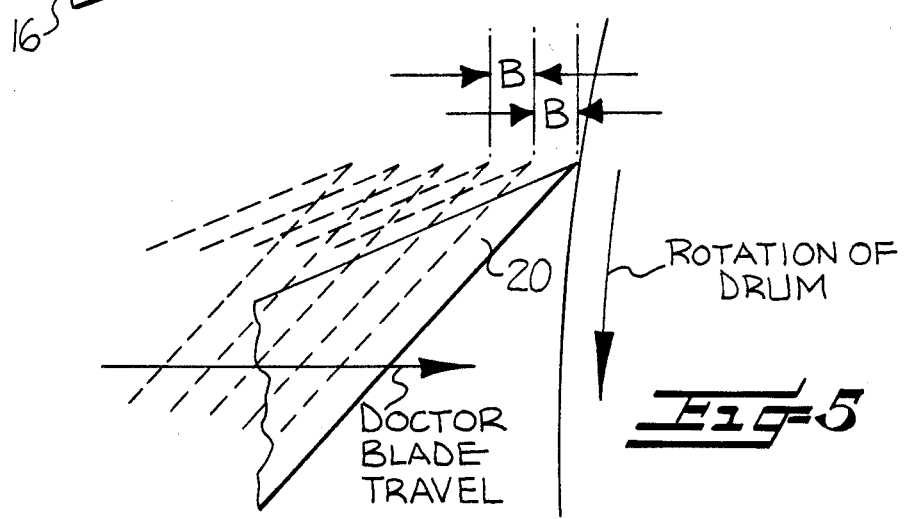
FIG. 5 shows the pattern of advance of the doctor blade towards the drum in a rotary vacuum drum filtration system.

FIG. 5 illustrates on a greatly enlarged scale the direction of travel of the doctor knife with respect to the drum. As schematically shown, each revolution of the drum results in the removal of a specified thickness B of filter aid and entrapped impurities. As discussed in detail below, with use of the filter aid of the present invention it has been found that the impurities will be trapped preferably within about 0.001–0.003 inch of the surface of the precoat. Accordingly a doctor knife cut B in the range of approximately 0.001 inch–0.003 inch will remove substantially all of the impurities filtered out during the preceding drum revolution, thereby leaving a fresh surface of precoat for the next revolution.

As filtration takes place, the doctor knife 20 continually advances toward the drum 12, eventually coming close enough, usually ¼ to ½ inch, that filtration must temporarily stop while the drum is washed and a new layer of precoat is applied.

In accordance with the present invention it has been found that the filter aid makeup should be carefully controlled so that the particles making up the filter aid fall within certain size ranges and have certain statistical distributions. It has been found that by proper statistical selection of the particle size distribution, the filtered out impurities can be trapped essentially within the above mentioned range of 0.001 inch to 0.003 inch of the precoat surface (resulting in slower doctor knife advance and longer precoat life), while at the same time maximizing the flow rate of superphosphoric acid through the precoat. The invention gives the filtration operator the option to either (1) maximize flow rates (production) with slightly greater knife cuts (on the order of 0.003 inch) or (2) maximize precoat duration to 12 hours and more by running at a less deep cut on the order of 0.002 inch and less, with a slight trade off in production. Other operating conditions may be utilized as desired by the operator. A more detailed discussion of what occurs at the microscopic level follows.

The size of filter aid particles is important for three basic functions: supporting the filter aid on a filtration screen; filtering or entrapping the insolubles to be removed from the superphosphoric acid; and allowing filtrate, i.e. the filtered superphosphoric acid, to flow rapidly through the filter aid. The sizes which are suitable for each of these functions, however, may not be and usually are not, identical. Rather, a different size of filter aid particle is primarily responsible for accomplishing each of these functions.

Relatively large particles are necessary for supporting the filter aid on the filter screen. These particles should be larger than the openings in the filter screen, and in typical applications will be on the order of 225 microns and larger.

A second smaller size range of particles should be of a size generally equivalent to the size range of the insoluble particles to be removed, typically on the order of about 42 microns and smaller.

A third intermediate size range will provide the proper interstitial spacing throughout the precoat to achieve an optimum flow rate of liquid through the filter aid.

Because the size particles desirable for support are not small enough to filter out insolubles, and because the size particles small enough to filter insolubles do not provide optimum flow rates, a good filter aid must provide enough particles of each of the relative sizes to perform each function well while avoiding having so many of one particular size of particles present that the other functions are overly impeded.

With a mixture of functions and particle size being a necessity, the distribution of the sizes becomes important in achieving desired filtration results. The present invention is directed towards achieving the most favorable sizes and distribution of sizes for the filtration of superphosphoric acid. In this regard, the large particles will span or "bridge" the permanent openings in the filtration screen. With the larger particles forming such a bridge, the particles smaller than these permanent openings are thereby prevented from passing through the filtering screen. These smaller particles, once supported by the larger ones, are on the order of the size of the impurities to be filtered out of the superphosphoric acid and thereby serve to do so. Finally, the remainder of the particles not of a size directly suitable for bridging or filtration must be in a size range that permits good flow rates of filtrate through the filter aid.

In the applicable filtration arts "particle size" is customarily determined by the percent by weight of the sample which is retained on (or alternatively, passes through) selected sizes of Tyler mesh. (A Tyler mesh is a testing sieve in which the Tyler scale number represents the number of meshes or holes per linear inch of the sieve.) Different size particles will thus either pass through, or be retained on specific sizes of Tyler mesh.

EXAMPLE

Superphosphoric acid was filtered on a rotary vacuum drum precoat filter in a process using a diatomaceous earth filter aid with the following particle size distribution:

| Tyler Mesh | Size in Microns | % Finer Than |
|---|---|---|
| 35 | 400 | 91 (±4) |
| 65 | 225 | 77 (±4) |
| 100 | 150 | 64 (±4) |
| 150 | 105 | 50 (±4) |
| 200 | 74 | 36 (±4) |
| 325 | 42 | 18 (±4) |

Figure 2:
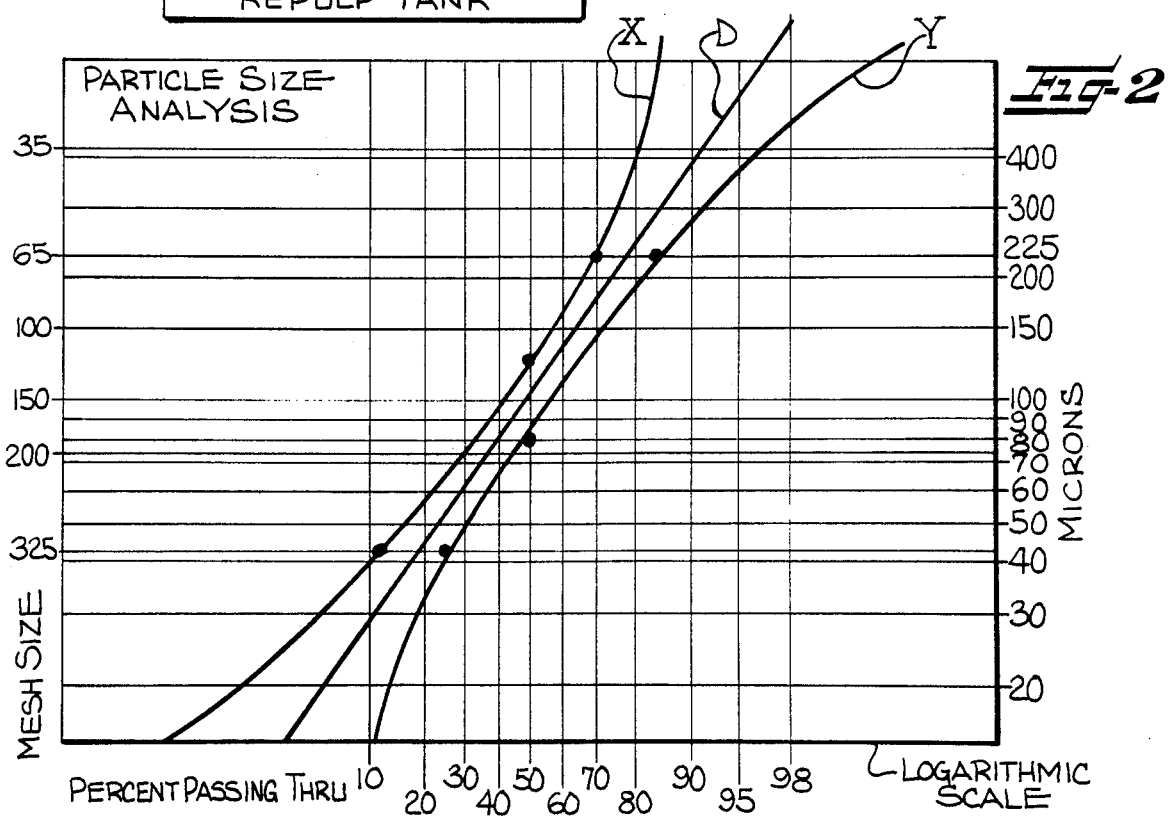
FIG. 2 is a graph showing as a straight line D one preferred particle size distribution for the filter aid and a range of distributions defined by the hourglass lines X,Y.

The above distribution of particle sizes is shown as a straight line D, "normal distribution" on the logarithmic ("log-log") scale of FIG. 2. As shown in the above table and in the scale, the mean particle size is the seive size through which 50% of the particles by weight will pass. Thus, the mean particle size according to the embodiment of the invention set forth in the Table is about 105 microns. Specifically, this mean is obtained by selecting a filter aid wherein approximately 50% by weight is retained on the 150 Tyler mesh. According to this embodiment, the filter aid specifications can include reasonable tolerances of ±4%; thus, the desired mean is achieved by selecting a filter aid wherein between 46%-54% by weight is retained on the 150 Tyler mesh.

The following parameters of operation were achieved with (1) the filter aid specified in connection with the above Example and (2) a typical non-statistically selected filter aid of the prior art used in a similar process.

| | Example | Prior Practice |
|---|---|---|
| Efficiency (Tons $P_2O_5$/Ton Filter Aid) | 90 | 55 |
| Rate of Flow (Tons $P_2O_5$/Hr.-Ft.$^2$) | 0.035 | 0.025 |
| Opening Size in Screen (Inches) | 0.009 | 0.009 |

As can be seen from the above comparison, the rate of flow and efficiency show remarkable improvement over the prior practices. As stated above, the present invention also gives the operator a new and very desirable ability to tailor the operation otherwise so that the rate of flow remains at, say, 0.025 Tons $P_2O_5$/Hr.-Ft$^2$ while greatly increasing the precoat life to twelve hours and more. Thus, when the operator needs maximum production rates (rate of flow) he can so tailor his operation. On the other hand, when maximum production is not necessary, he can choose to operate with a much shallower knife cut than in the prior practice with resultant longer precoat life and extraordinary efficiency.

While the specified results were achieved with the particular normal distribution of particle size specified in the table above (including the ±4% tolerance at each Tyler measuring point) it has been found that the invention may be more broadly defined. More particularly, the invention may be defined by reference to the percentage range (by weight) of particles that are large enough to bridge the screen openings, the range of particles having sizes on the order of the impurities being filtered out, and a distribution of particles throughout the intermediate range of particle sizes. A superior filter aid having the advantageous filtering characteristics set forth above may be produced as a heterogeneous mixture of particle sizes having the following particle size characteristics: from about 18% to about 30% by weight of the particles having a size greater than about 225 microns; from about 12% to about 25% by weight of the particles having a size less than about 42 microns; and the remainder of the particles being distributed throughout an intermediate range of particle sizes between about 42 microns to about 225 microns. The distribution of the particles should be weighted toward the mean particle size to achieve the best results (particularly in terms of flow rate) i.e., the distribution should be such that particles of all sizes are present throughout the range of sizes of the filter aid, with the probability being such that more particles are found near the mean size than elsewhere. The most preferred distribution is one where the distribution approximates a normal, or Gaussian, distribution. As best understood, a distribution approximating normal distribution results in more uniform "packing" of particles as compared to the packing of a non-normal distribution. Generally, a non-normal distribution of particles shows a combination of over-packed and under-packed areas, both of which may have undesirable effects in filtration. Specifically, over-packed areas hinder desirable flow rates while under-packed areas hinder filtration and allow excessive penetration of insolubles into the precoat.

With the impurity size range (typically iron and magnesium compounds) found in superphosphoric acid, the most desired range for the mean particle size is from about 80 microns to about 130 microns, with a mean size on the order of about 105 microns being most preferred.

While diatomaceous earth has been set forth as one particular composition for the filter aid of the invention, other filter aid compositions of essentially the same particle size distribution have been shown to give similar improved filtration results. In laboratory tests both gypsum, an insoluble calcium sulfate ($CaSO_4$) by-product of the production of phosphoric acid, and "pearlite", a volcanic pumice material, give greatly improved filtration of superphosphoric acid when filter aid composed of these materials is statistically selected to have the desired size distribution.

While the invention may be defined in the manner specified above, it also has been found that the empirically derived data relating to filter aids within the scope of this invention permit the range of such filter aids to be plotted as the hourglass area enveloped by the lines X,Y appearing in the logarithmic scale of FIG. 2. This area defines to those skilled in the art a set of curves representing particle size distributions that fall within the scope of the invention and achieve the advantageous results specified above.

As noted above, the present invention enables the operator to run the precoat for exceptionally long periods of time, for example, twelve hours or more. It has been noted that in running precoats of diatomaceous earth for such long periods the reactivity of the precoat, and resultant "blinding", become more acute problems. In the production of diatomaceous earth filter aids, the diatomaceous earth is mixed with fluxing agents such as $Na_2CO_3$ (sodium carbonate) and then calcined. As a result larger particles can be made from the diatomaceous earth and some of the acid soluble materials are made insoluble. However, it has been found that after a period of time in the filtration process the silica compounds formed during calcination are gradually dissolved, exposing acid soluble matter such as calcium which then is free to react with the superphosphoric acid being filtered to create blockage within the filter aid and resultant loss in filtration rate. In the worse cases the entire filter aid matrix may be cross-linked by chain reaction to such a point that sheets of diatomaceous earth and reacted materials can be removed from the surface of the filter aid—total "blinding".

As a result of the foregoing discovery, it has been determined that the diatomaceous earth filter aids should have a low total calcium content no more than about 2%, and preferably no more than about 1.2% by weight as measured as calcium oxide (CaO). Furthermore, the filter aid should have a low reactivity in HCl such that the weight loss from such a reaction is less than about 1% of the weight of the sample. Finally, it has also been found that the moisture content of the filter aid prior to application to the drum should be low, preferably no more than about ½%.

While the present invention has been described in connection with several embodiments, certain modifications may be made without departing from the true spirit and scope of the invention.

That which is claimed is:

1. A method of filtering solid impurities from superphosphoric acid in a vacuum or pressurized filtration process wherein a filter aid is formed as a precoat on a filtration screen, said method providing enhanced filtration rates while achieving more efficient use of filter aid and improved product purity, said method comprising filtering superphosphoric acid through a filter aid formed by a heterogeneous mixture of particles having the following particle size characteristics:

from about 18% to about 30% by weight of the particles having a size greater than about 225 microns;
    from about 12% to about 25% by weight of the particles having a size less than about 42 microns; and
    the remainder of the particles being distributed throughout an intermediate range of particle size between about 42 microns to about 225 microns.

2. A method according to claim 1 wherein the distribution of the particles is weighted toward the means size of the heterogeneous mixture.

3. A method according to claim 1 wherein the means size of the heterogeneous mixture is between about 80 and about 130 microns.

4. A method according to claim 3 wherein the means size of the heterogeneous mixture is about 105 microns.

5. A method according to one of claims 2, 3 or 4 wherein the distribution of particle sizes is substantially a normal distribution.

6. A method according to claim 5 wherein the composition of the filter aid particles is selected from the group consisting of diatomaceous earth, sulfate gypsum and volcanic pumice.

7. A method of filtering solid impurities from superphosphoric acid in a vacuum or pressurized filtration process wherein a filter aid is formed as a precoat on a filtration screen, said method providing enhanced filtration rates while achieving more efficient use of filter aid and improved product purity, said method comprising filtering superphosphoric acid through a filter aid formed by a heterogeneous mixture of particles having the following particle size characteristics:

from about 19% to about 27% by weight of the particles having a size greater than 225 microns;
    from about 14% to about 22% by weight of the particles having a size less than about 42 microns;
    the remainder of the particles falling in the intermediate range of particle sizes between about 42 microns and about 225 microns;
    the median particle size being on the order of about 105 microns; and the particles defining substantially a normal distribution of particle sizes.

8. A method according to claim 7 wherein the normal distribution is further defined by the following:

| Particle Size In Microns | % Finer Than |
|---|---|
| 400 | 91 ± 4 |
| 225 | 77 ± 4 |
| 150 | 64 ± 4 |
| 105 | 50 ± 4 |
| 74 | 36 ± 4 |
| 42 | 18 ± 4 |

9. A method according to claim 7 wherein the composition of the filter aid particles is selected from the group consisting of diatomaceous earth, sulfate gypsum and volcanic pumice.

10. A method of filtering solid impurities from superphosphoric acid in a vacuum or pressurized filtration process wherein a filter aid is formed as a precoat on a filtration screen, said method providing enhanced filtration rates while achieving more efficient use of filter aid and improved product purity, said method comprising filtering superphosphoric acid through a filter aid formed by a heterogeneous mixture of particles having the following particle size characteristic:

from about 18% to about 30% by weight of the particles having a size as the size of the openings in the filtration screen;

from about 12% to about 25% by weight of the particles having sizes in a size range on the order of the size range of the solid impurities to be filtered out; and the remainder of the particles being distributed throughout an intermediate range of particles sizes between the screen opening size and the solid impurities size range.

11. A method according to claim 10 wherein the mean size of the heterogeneous mixture is between about 80 and about 130 microns.

12. A method according to claim 11 wherein the means size of the heterogeneous mixture is about 105 microns.

13. A method according to one of claims 10, 11, or 12 wherein the distribution of particle sizes is substantially a normal distribution.

14. A method of filtering solid impurities from superphosphoric acid in a vacuum filtration process wherein a filter aid is formed as a precoat on a filtration screen, said method providing enhanced filtration rates while achieving more efficient use of filter aid and improved product purity, said method comprising filtering superphosphoric acid through a filter aid formed by a heterogeneous mixture of particles having a particle size distribution by weight that defines a curve substantially falling within the area enveloped by the lines X, Y of the chart of FIG. 2.

15. A method according to claim 14 wherein the curve falls substantially along the line D of FIG. 2.

* * * * *

UNITED STATES PATENT AND TRADEMARK OFFICE
CERTIFICATE OF CORRECTION

PATENT NO. : 4,547,295

DATED : October 15, 1985

INVENTOR(S) : Carr, Jr. et al

It is certified that error appears in the above-identified patent and that said Letters Patent is hereby corrected as shown below:

Column 8, line 37, "means" should be --mean--.

Column 8, line 39, "means" should be --mean--.

Column 8, line 42, "means" should be --mean--.

Column 9, line 30, after the words "a size as", insert --great as--.

Column 10, line 13, "means" should be --mean--.

Signed and Sealed this

Second Day of December, 1986

*Attest:*

DONALD J. QUIGG

*Attesting Officer*  *Commissioner of Patents and Trademarks*